April 2, 1957  W. EISSFELDT  2,787,189

PULL-DOWN CLAW MECHANISM FOR CINEMATOGRAPHIC CAMERAS

Filed Nov. 27, 1953

Inventor:
Werner Eissfeldt
BY: Michael S. Striker
Agt.

United States Patent Office 2,787,189
Patented Apr. 2, 1957

2,787,189

PULL-DOWN CLAW MECHANISM FOR CINEMATOGRAPHIC CAMERAS

Werner Eissfeldt, Berlin-Wannsee, Germany, assignor to Josef Georg Johannes Metzner, Berlin-Grunewald, Germany Application November 27, 1953, Serial No. 394,854

Claims priority, application Germany December 11, 1952

14 Claims. (Cl. 88—18.4)

The present invention relates to cinematographic cameras, and more particularly to pull-down claw means for such cameras.

In known cinematographic cameras, there is a certain period when the film is exposed and a certain period when the film is covered by the shutter, the covering and exposure of the film taking place successively in a repeated cycle of operations, and, for example, during each cycle the film may be exposed 50% of the time and covered 50% of the time. Certain constructions are known which increase the exposure portion of each cycle at the expense of the portion during which the film is covered.

Since the pull-down mechanisms cannot remain stationary during exposure of the film, it is necessary for these mechanisms to move idly through a relatively large path until the film is again moved, the pull-down mechanism being operated continuously. This increases the power required for operation of the camera significantly. If, for example, a pull-down claw mechanism only moves the film during 25% of each cycle of movement of the pull-down mechanism, then the remaining 75% of the movement of the pull-down mechanism requires a certain amount of power and such mechanisms are not suitable for use with cameras having a fast rate of film exposures, as are used nowadays.

One of the objects of the present invention is to overcome the above drawbacks by providing a cinematographic with a pull-down claw mechanism which greatly reduces the amount of power required for moving the mechanism by causing the rate of movement of the claw mechanism to rapidly drop off immediately after the claw mechanisms leaves the film, to become a minimum in the middle of the path through which the claw mechanism moves back toward the film, and to gradually increase as the claw mechanism approaches the film during movement through the second part of its idle path. In this way, it is possible to provide claw mechanisms which can operate with cameras having a frequency of film exposure of more than 100–300 per second.

A further object of the present invention is to provide a pull-down claw mechanism which is not only capable of operating rapidly, but which, in addition, is capable of providing a larger exposure time during each cycle of movement of the claw mechanism and film.

Another object of the present invention is to provide a pull-down claw mechanism which may be easily adapted for use with different cameras requiring different lengths of film movement during each cycle of operation of the pull-down claw mechanism.

Still another object of the present invention is to provide a pull-down claw mechanism which requires much less power than known claw mechanisms for moving the claw away from and back to the film.

An additional object of the present invention is to provide a mechanism capable of accomplishing all of the above objects and at the same time being made up of a relatively small number of simple and ruggedly constructed parts which are relatively inexpensive to manufacture and assemble, and which are capable of giving reliable operation over a long period of time.

With the above objects in view, the present invention mainly consists of a cinematographic camera which includes a claw means having an operating end portion for periodically moving a film strip, and a guide means engaging the claw means to guide the latter for translational movement in a predetermined plane and for simultaneous turning movement about an axis normal to this plane. A moving means is operatively connected to the claw means for moving the operating end portion thereof first along a predetermined arc from one point thereof to another point thereof for moving a film strip along this arc between the points involved, and then away from the said other point and back to the said one point along a continuous line made up of a plurality of additional arcs.

Also with the above objects in view, the present invention mainly consists of a cinematographic camera which includes a support means and a planetary transmission, including a planetary member and a sun member having a peripheral portion in engagement with the periphery of the planetary member, this sun member being fixed to the support means and having its center located in a first axis, and the diameter of the sun member being a multiple of the diameter of the planetary member. A turning means is operatively connected to the planetary member for turning the latter about the said first axis and along the peripheral portion of the sun member so that the planetary member turns through a complete number of revolutions after once moving around the periphery of the sun member. A crank pin extends parallel to the said first axis and is connected to the planetary member for rotation therewith, and an elongated claw means is located in a plane normal to the said first axis, is pivotally connected to the crank pin, and has an operating end portion distant from the crank pin. A guide means engages the claw means to guide the latter for translational movement in the said plane and for simultaneous movement about a second axis parallel to the first axis, so that when the crank pin describes a first arc during one revolution of the planetary member, the operating end portion of the claw means simultaneously describes a second arc along which a film strip is adapted to be periodically moved by the claw means, these first and second arcs having a common center of curvature and the second axis passing through this common center of curvature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
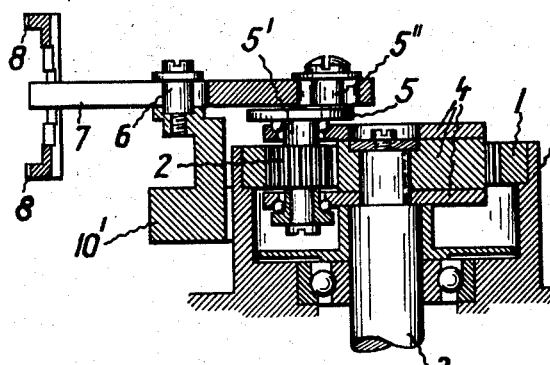
Fig. 1 is a fragmentary, partly sectional, elevational view of one possible apparatus constructed in accordance with the present invention.
Figure 3:
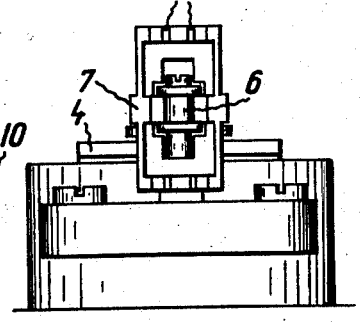
Fig. 3 is a view of the apparatus of Fig. 1 as seen from the left side of Fig. 1.
Figure 2:
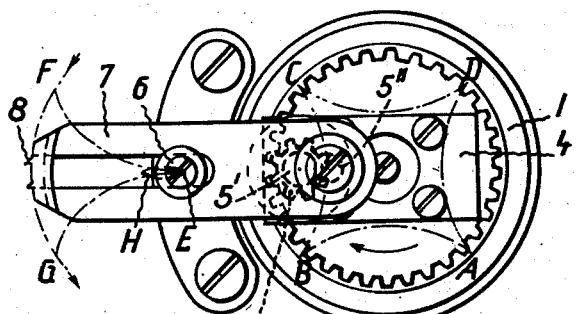
Fig. 2 is a top plan view of the apparatus of Fig. 1.

Referring now to the drawings, and in particular to Figs. 1–3, it will be seen that the structure of the invention includes a support 10 fixed in the interior of a cinematographic camera and being cylindrical. A sun gear 1 is fixed to the upper free end of the support means 10, as viewed in Fig. 1, the center of this sun gear 1 being located in the central axis of the cylindrical support 10, and this sun gear 1 has an inner annular toothed peripheral portion.

A planetary gear 2 meshes with the inner teeth of the sun gear 1, and this sun gear 1 has a diameter which is a multiple of the diameter of the planetary gear 2. In the particular example illustrated in Figs. 1–3, the diameter of sun gear 1 is four times the diameter of the planetary gear 2. This planetary gear 2 is fixed to a lower arm 5' of a two armed crank 5, as shown in Fig. 1, this lower arm of the crank 5 being shown beneath the second upper arm 5" of the crank 5 and extending coaxially through the planetary gear 2 and the two ball bearings located respectively adjacent the two end faces of this planetary gear. The second, upper arm 5" of the crank 5, as viewed in Fig. 1, is spaced from the center of planetary gear 2 by a distance equal to the pitch radius of the planetary gear 2, so that an extension of the axis of this second upper arm 5" of the crank 5 passes along the pitch circle of the planetary gear 2.

The lower arm 5' of the crank 5 is pivotally connected by suitable ballbearings or the like to a pair of parallel parts of an arm 4, these parallel parts being located respectively above and below the gears 1 and 2, and the arm 4 is in turn fixedly connected to the end of a drive shaft 3 whose axis is coincident with the axis of the cylindrical support 10, this drive shaft 3 being turnably carried by the support 10 through the medium of a ballbearing, for example, as shown in Fig. 1, and any suitable constant speed motor or the like is connected to the drive shaft 3 for rotating the same.

The support 10 includes a portion 10' rigid with the support 10 and having a guide pin 6 fixed thereto and extending along an axis which is parallel to the axis of the drive shaft 3 and support 10, and it should be noted that the upper arm of the crank 5, as viewed in Fig. 1, also has its axis parallel to the axis of support 10.

A claw means 7, 8 is provided to move the film strip, and this claw means includes an elongated arm 7 located in a plane normal to the axes of guide pin 6 and cylindrical support 10, this arm 7 being pivotally connected at its right hand end, as viewed in Figs. 1 and 2, to the upper arm of the crank 5. The arm 7 is formed with an elongated cutout through which the pin 6 extends, this pin 6 slidably engaging the arm 7 at opposite sides of the elongated cutout formed therein, and the arm 7 slidably engages the top surface of the portion 10' of support 10, as viewed in Fig. 1. The claw means includes an operating end portion 8 located distant from the crank 5, being fixed to the arm 7, and having teeth for engaging the perforations of the film strip, as shown in Figs. 1–3.

The operation of the above described structure is most clearly seen from Fig. 2. The shaft 3 and consequently the arm 4 turns in a clockwise direction, as shown by the arrow of Fig. 2, and because the diameter of sun gear 1 is a multiple of the diameter of the planetary gear 2, it is evident that this planetary gear 2 will rotate through a complete number of revolutions after having once moved around the inner tooth periphery of the sun gear 1. Thus, with the particular apparatus shown in Figs. 1–3, each time the planetary gear 2 moves once around the inner periphery of the sun gear 1, this planetary gear turns through four complete revolutions, and consequently the upper crank pin of crank 5, as viewed in Fig. 1, describes the arcs A—B, B—C, C—D, and D—A. At the same time the arm 7 of the claw means 7, 8 is free to move in translation in the plane normal to the axis of support 10 and pin 6, and also the pin 6 causes the arm 7 to simultaneously move about the axis of the pin 6. Thus, during the time that the upper crank pin of crank 5 moves along the arc B—C, the operating end portion 8 of the claw means moves along the arc F—G, in the direction of the arrow shown at the left of Fig. 2. Then, while the crank pin moves through the arcs C—D, D—A, and A—B, the operating end portion 8 of the claw means moves through the arcs G—E, E—H—E, and E—F, respectively. The film is moved while the operating end portion 8 of the claw means moves along the arc F—G, and it will be seen that as the claw means moves from point G of this arc back to point F thereof the speed of movement of the claw means rapidly drops off until the claw means is midway between points G and F and then the speed of movement of the claw means increases as the operating end portion 8 thereof moves along the arc E, F back to the point F to again move the film.

It has been found that the best results are obtained when the arcs F—G and B—C have a common center of curvature through which the axis of guide pin 6 passes. With such an arrangement, it is possible to very easily adapt the teeth of the planetary transmission to the spaces between the perforations of the film strip. Of course, where the radii of arcs B—C and F—G are equal, the axis of pin 6 is located midway between these two arcs, but this latter feature is not at all essential to the invention.

Figure 4:
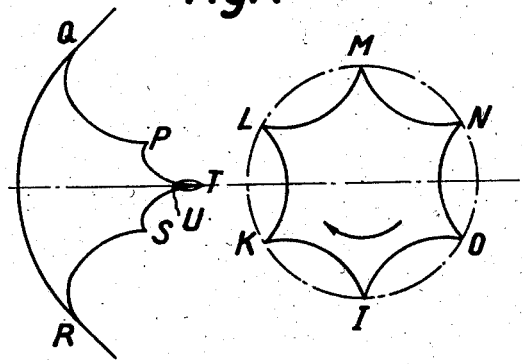
Fig. 4 is a diagrammatic illustration of the operation of an embodiment of the invention slightly different from that of Figs. 1–3.

It will be seen from the above description that the advantages mentioned in the introduction of this specification are obtained by the structure shown in Figs. 1–3. However, it should be emphasized that the 1–4 ratio between the diameters of the planetary and sun gears is not at all essential. With this arrangement, the film actually moves during 25% of each cycle of film movement and remains stationary through the other 75% of the film movement. In the event that it is desired to change this arrangement, it is only necessary to change the relationship between the gears 1 and 2. Thus, for example, Fig. 4 shows an arrangement where the sun gear has a diameter which is six times the diameter of the planetary gear, and with this arrangement, as the crank pin moves through the arcs K—L, L—M, M—N, N—O, O—I, and I—K, the operating end portion of the claw means moves along the arcs Q—R, R—S, S—T, T—U—T, T—P, and P—Q, respectively. With the arrangement of Fig. 4, the film will actually move during 16.67% of each cycle of film movement and will remain stationary during 83.33% of each cycle of film movement.

It will be understood that each of the elements described above, or two or more together, may also find a useful application in other types of cinematographic cameras differing from the types described above.

While the invention has been illustrated and described as embodied in claw mechanisms for cinematographic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being greater than and a multiple of the diameter of said planetary member; turning means operatively connected to said planetary member for turning the latter about said first axis and along said peripheral portion of said sun member so that said planetary member turns through more than one complete number of revolutions after once moving around the periphery of said sun member; a crank pin extending parallel to said first axis and connected to said planetary member for rotation therewith; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary member said operating end portion of said claw means simultaneously describes a second arc along which a film strip is adapted to be periodically moved by said claw means.

2. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being greater than and a multiple of the diameter of said planetary member; turning means operatively connected to said planetary member for turning the latter about said first axis and along said peripheral portion of said sun member so that said planetary member turns through more than one complete number of revolutions after once moving around the periphery of said sun member; a crank pin extending parallel to said first axis and connected to said planetary member for rotation therewith; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary member said operating end portion of said claw means simultaneously describes a second arc along which a film strip is adapted to be periodically moved by said claw means, said second axis being located between said crank pin and said operating end portion of said claw means.

3. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being greater than and a multiple of the diameter of said planetary member; turning means operatively connected to said planetary member for turning the latter about said first axis and along said peripheral portion of said sun member so that said planetary member turns through more than one complete number of revolutions after once moving around the periphery of said sun member; a crank pin extending parallel to said first axis and connected to said planetary member for rotation therewith; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary member said operating end portion of said claw means simultaneously describes a second arc along which a film strip is adapted to be periodically moved by said claw means, said first and second arcs having a common center of curvature and said second axis passing through said common center of curvature.

4. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being greater than and a multiple of the diameter of said planetary member; turning means operatively connected to said planetary member for turning the latter about said first axis and along said peripheral portion of said sun member so that said planetary member turns through more than one complete number of revolutions after once moving around the periphery of said sun member; a crank pin extending parallel to said first axis and connected to said planetary member for rotation therewith, said pin being spaced from the center of said planetary member by a distance substantially equal to the radius of said planetary member; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary member said operating end portion of said claw means simultaneously describes a second arc along which a film strip is adapted to be periodically moved by said claw means.

5. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being greater than and a multiple of the diameter of said planetary member; turning means operatively connected to said planetary member for turning the latter about said first axis and along said peripheral portion of said sun member so that said planetary member turns through more than one complete number of revolutions after once moving around the periphery of said sun member; a crank pin extending parallel to said first axis and connected to said planetary member for rotation therewith, said pin being spaced from the center of said planetary member by a distance substantially equal to the radius of said planetary member; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary member said operating end portion of said claw means simultaneously describes a second arc along which a film strip is adapted to be periodically moved by said claw means, said first and second arcs having a common center of curvature and said second axis passing through said common center of curvature.

6. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being greater than and a multiple of the diameter of said planetary member; turning means operatively connected to said planetary member for turning the latter about said first axis and along said peripheral portion of said sun member so that said planetary member turns through more than one complete number of revolutions after once moving around the periphery of said sun member; a crank pin extending parallel to said first axis and connected to said planetary member for rotation therewith; elongated claw means located in a plane normal to said first axis, being pivotally connected to said crank pin, and having an operating end portion distant from said crank pin, said claw means being formed with an elongated cutout; and a guide pin extending through said elongated cutout of said claw means, slidably engaging the latter, being fixed to said support means, and extending along a second axis parallel to said first axis so as to guide said claw means for translational movement in said plane and for simultaneous movement about said second axis, so that when said crank pin describes a first arc during one revolution of said planetary member said operating end portion of said claw means simultaneously describes a second arc along which a film strip is adapted to be periodically moved by said claw means.

7. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being greater than and a multiple of the diameter of said planetary member; turning means operatively connected to said planetary member for turning the latter about said first axis and along said peripheral portion of said sun member so that said planetary member turns through more than one complete number of revolutions after once moving around the periphery of said sun member; a crank pin extending parallel to said first axis and connected to said planetary member for rotation therewith, said pin being spaced from the center of said planetary member by a distance substantially equal to the radius of said planetary member; elongated claw means located in a plane normal to said first axis, being pivotally connected to said crank pin, and having an operating end portion distant from said crank pin, said claw means being formed with an elongated cutout; and a guide pin extending through said elongated cutout of said claw means, slidably engaging the latter, being fixed to said support means, and extending along a second axis parallel to said first axis so as to guide said claw means for translational movement in said plane and for simultaneous movement about said second axis, so that when said crank pin describes a first arc during one revolution of said planetary member said operating end portion of said claw means simultaneously describes a second arc along which a film strip is adapted to be periodically moved by said claw means.

8. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being greater than and a multiple of the diameter of said planetary member; turning means operatively connected to said planetary member for turning the latter about said first axis and along said peripheral portion of said sun member so that said planetary member turns through more than one complete number of revolutions after once moving around the periphery of said sun member; a crank pin extending parallel to said first axis and connected to said planetary member for rotation therewith, said pin being spaced from the center of said planetary member by a distance substantially equal to the radius of said planetary member; elongated claw means located in a plane normal to said first axis, being pivotally connected to said crank pin, and having an operating end portion distant from said crank pin, said claw means being formed with an elongated cutout; and a guide pin extending through said elongated cutout of said claw means, slidably engaging the latter, being fixed to said support means, and extending along a second axis parallel to said first axis so as to guide said claw means for translational movement in said plane and for simultaneous movement about said second axis, so that when said crank pin described a first arc during one revolution of said planetary member said operating end portion of said claw means simultaneously describes a second arc along which a film strip is adapted to be periodically moved by said claw means, said first and second arcs having a common center of curvature and said second axis passing through said common center of curvature.

9. In a cinematographic camera, in combination, support means; a planetary transmission including a planetary gear having a toothed peripheral portion and a sun gear having a toothed peripheral portion meshing with the toothed peripheral portion of said planetary gear, said sun gear being fixed to said support means and having its center located in a first axis, and the diameter of said sun gear being greater than and a multiple of the diameter of said planetary gear; turning means operatively connected to said planetary gear for turning the latter about said first axis and along the toothed peripheral portion of said sun gear so that said planetary gear turns through more than one complete number of revolutions after once moving around the periphery of said sun gear; a crank pin extending parallel to said first axis and connected to said planetary gear for rotation therewith; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary gear said operating end portion of said claw means simultaneously describes a second arc along which a film strip is adapted to be periodically moved by said claw means.

10. In a cinematographic camera, in combination, support means; a planetary transmission including a planetary gear having a toothed peripheral portion and an annular sun gear having an inner toothed peripheral portion meshing with the toothed peripheral portion of said planetary gear, said sun gear being fixed to said support means and having its center located in a first axis, and the diameter of said sun gear being greater than and a multiple of the diameter of said planetary gear; turning means operatively connected to said planetary gear for turning the latter about said first axis and along the toothed peripheral portion of said sun gear so that said planetary gear turns through more than one complete number of revolutions after once moving around the periphery of said sun gear; a crank pin extending parallel to said first axis and connected to said planetary gear for rotation therewith; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary gear said operating end portion of said claw means simultaneously describes a second arc along which a film strip is adapted to be periodically moved by said claw means.

11. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being four times the diameter of said planetary member; turning means operatively connected to said planetary member for turning the latter about said first axis and along said peripheral portion of said sun member so that said planetary member turns through a complete number of revolutions after once moving around the periphery of said sun member; a crank pin extending parallel to said first axis and connected to said planetary member for rotation therewith; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary member said operating end portion of said claw means simultaneously describes a second arc along which a film strip is adapted to be periodically moved by said claw means.

12. In a cinematographic camera, in combination, support means; a planetary transmission including a planetary member and a sun member having a peripheral portion in engagement with the periphery of said planetary member, said sun member being fixed to said support means and having its center located in a first axis, and the diameter of said sun member being six times the diameter of said planetary member; turning means operatively connected to said planetary member for turning the latter about said first axis and along said peripheral portion of said sun member so that said planetary member turns through a complete number of revolutions after once moving around the periphery of said sun member; a crank pin extending parallel to said first axis and connected to said planetary member for rotation therewith; elongated claw means located in a plane normal to said first axis, being pivotally connected to said crank pin, and having an operating end portion distant from said crank pin; and guide means engaging said claw means to guide the latter for translational movement in said plane and for simultaneous movement about a second axis parallel to said first axis, so that when said crank pin describes a first arc during one revolution of said planetary member said operating end portion of said claw means simultaneously describes a second arc along which a film strip is adapted to be periodically moved by said claw means.

13. In a cinematographic camera, in combination, a cylindrical support located about a first axis coinciding with the axis of said support; a planetary gear; an annular sun gear having an inner toothed peripheral portion meshing with said planetary gear and having its center located in said first axis, the diameter of said sun gear being greater than and a multiple of the diameter of said planetary gear; a crank having a first arm extending through said planetary gear along the axis thereof and being fixed thereto, said crank having a second arm spaced from the center of said planetary gear by a distance equal to the pitch radius of said planetary gear; a drive shaft extending along said first axis and being carried by said support for rotation about said first axis; a third arm pivotally connected to said first arm of said crank and being fixed to said shaft so that during rotation of said shaft said planetary gear moves around the inner peripheral portion of said sun gear and rotates said second arm of said crank through more than one complete number of revolutions after once moving around said sun gear; elongated claw means pivotally connected at one end to said second arm of said crank, being located in a plane normal to said first axis, being formed with an elongated cutout, and having an operating end portion distant from said second arm of said crank; and a guide pin fixed to said support, extending through said cutout of said claw means, slidably engaging the latter at opposite sides of said elongated cutout, and extending along a second axis parallel to said first axis.

14. In a cinematographic camera, in combination, a cylindrical support located about a first axis coinciding with the axis of said support; a planetary gear; an annular sun gear having an inner toothed peripheral portion meshing with said planetary gear and having its center located in said first axis, the diameter of said sun gear being greater than and a multiple of the diameter of said planetary gear; a crank having a first arm extending through said planetary gear along the axis thereof and being fixed thereto, said crank having a second arm spaced from the center of said planetary gear by a distance equal to the pitch radius of said planetary gear; a drive shaft extending along said first axis and being carried by said support for rotation about said first axis; a third arm pivotally connected to said first arm of said crank and being fixed to said shaft so that during rotation of said shaft said planetary gear moves around the inner peripheral portion of said sun gear and rotates said second arm of said crank through more than one complete number of revolutions after once moving around said sun gear; elongated claw means pivotally connected at one end to said second arm of said crank, being located in a plane normal to said first axis, being formed with an elongated cutout, and having an operating end portion distant from said second arm of said crank; and a guide pin fixed to said support, extending through said cutout of said claw means, slidably engaging the latter at opposite sides of said elongated cutout, and extending along a second axis parallel to said first axis, so that when said second arm of said crank describes a first arc during one revolution of said planetary gear said operating end portion of said claw means simultaneously describes a second arc along which a film strip is adapted to be periodically moved by said claw means, said first and second arcs having a common center of curvature and said second axis passing through said common center of curvature.

References Cited in the file of this patent

FOREIGN PATENTS 25,427   Denmark _____ Jan. 12, 1920